United States Patent
Park et al.

(10) Patent No.: US 10,273,355 B2
(45) Date of Patent: Apr. 30, 2019

(54) THERMOPLASTIC RESIN COMPOSITION

(71) Applicant: Lotte Advanced Materials Co., Ltd., Yeosu-si (KR)

(72) Inventors: Ji Eun Park, Uiwang-si (KR); Young Hyo Kim, Uiwang-si (KR); Ja Yoon Kim, Uiwang-si (KR); Kang Yeol Park, Uiwang-si (KR)

(73) Assignee: Lotte Advanced Materials Co., Ltd., Yeosu-si (KR)

(*) Notice: Subject to any disclaimer, the term of this patent is extended or adjusted under 35 U.S.C. 154(b) by 0 days.

(21) Appl. No.: 14/837,290

(22) Filed: Aug. 27, 2015

(65) Prior Publication Data

US 2016/0060446 A1    Mar. 3, 2016

(30) Foreign Application Priority Data

Aug. 29, 2014 (KR) .......... 10-2014-0114059

(51) Int. Cl.
| | | |
|---|---|---|
| *C08L 25/12* | (2006.01) | |
| *C08L 25/16* | (2006.01) | |
| *C08L 51/04* | (2006.01) | |
| *C08K 5/3435* | (2006.01) | |
| *C08K 5/3492* | (2006.01) | |

(52) U.S. Cl.
CPC ........... *C08L 25/12* (2013.01); *C08K 5/3435* (2013.01); *C08K 5/3492* (2013.01); *C08L 2205/02* (2013.01); *C08L 2205/025* (2013.01); *C08L 2205/035* (2013.01)

(58) Field of Classification Search
CPC .......... C08L 51/06; C08L 25/16; C08L 33/20; C08L 25/12; C08L 2205/02; C08L 2205/25

See application file for complete search history.

(56) References Cited

U.S. PATENT DOCUMENTS

| | | | | |
|---|---|---|---|---|
| 4,224,419 A * | 9/1980 | Swoboda | .............. | C08L 51/003 |
| | | | | 525/71 |
| 2002/0167112 A1* | 11/2002 | Colburn, Jr. | ............ | C08L 33/12 |
| | | | | 264/211 |
| 2010/0113648 A1* | 5/2010 | Niessner | ............... | C08F 279/02 |
| | | | | 523/351 |
| 2012/0114933 A1* | 5/2012 | Meyer Zu Berstenhorst | .............. | |
| | | | | C09D 175/16 |
| | | | | 428/331 |
| 2012/0184651 A1* | 7/2012 | Hurst | ...................... | C08L 67/02 |
| | | | | 524/96 |
| 2012/0302676 A1* | 11/2012 | Oya | .......................... | C08J 5/18 |
| | | | | 524/89 |
| 2013/0273813 A1* | 10/2013 | Prasad | .................... | B24B 37/24 |
| | | | | 451/6 |

FOREIGN PATENT DOCUMENTS

| | | | | |
|---|---|---|---|---|
| DE | 2826925 A1 * | 1/1980 | ........... | C08L 51/003 |
| JP | 2009-203269 A | 9/2009 | | |
| KR | 10-2013-0057795 A | 6/2013 | | |
| KR | 10-2014-0068672 A | 6/2014 | | |

OTHER PUBLICATIONS

Mitchell (Chapter 2 Material Selection Considerations, Tool and Manufacturing Engineers Handbook vol. VIII Plastic Part Manufacturing. 1996, pp. 2-1 to 2-5).*
Zweifel (Chapter 2: Principles of Stabilization, Chapter 3: Principles of Stabilization of Individual Substrates and Appendix 3, Stabilization of Polymeric Materials. 1998, pp. 41-106 and pp. 181-209).*
UV-1577 Technical Data Sheet, Hunan Chemical BV, 2017, 3 pages.*
Ciba Tinuvin P Benzotriazole UV Absorber, Ciba, 2008, 2 pages.*
Wypych, Anna and George, Tinuvin 327, Databook of UV Stabilizers, Toronto:ChemTec Publishing, 2015, pp. 116-117.*
High lights! Energy curing for industrial coatings and graphic arts. BASF, 32 pages.*
Tinuvin 234 Low Volatile Benzotriazole UV Absorber, BASF, 2010, 3 pages.*
Office Action in counterpart Korean Application No. 10-2014-0114059 dated Jul. 6, 2016, pp. 1-5.

* cited by examiner

*Primary Examiner* — Brieann R Johnston
(74) *Attorney, Agent, or Firm* — Additon, Higgins & Pendleton, P.A.

(57) ABSTRACT

A thermoplastic resin composition includes: (A) an acrylic graft copolymer; (B) an aromatic vinyl-vinyl cyanide-based copolymer; (C) a light stabilizer; and (D) a UV absorber having a maximum absorption wavelength of about 250 nm to about 320 nm. The thermoplastic resin composition can realize good coloring properties and weather resistance, while providing a high quality external appearance.

12 Claims, No Drawings

THERMOPLASTIC RESIN COMPOSITION

CROSS-REFERENCE TO RELATED APPLICATION

This application claims priority under 35 USC Section 119 to and the benefit of Korean Patent Application 10-2014-0114059, filed Aug. 29, 2014, the entire disclosure of which is incorporated herein by reference.

FIELD OF THE INVENTION

The present invention relates to a thermoplastic resin composition.

BACKGROUND

Thermoplastic resins have lower specific weight than glass and metal and can exhibit excellent properties in terms of molding processability and impact resistance, and are thus used in the production of interior/exterior materials for electric and electronic products, automobile components, interior/exterior materials for buildings, leisure products, and the like. In recent years, with a trend of size increase and weight reduction of electric and electronic products, thermoplastic resin-based plastic products have rapidly replaced glass and metal products.

Accordingly, various studies have been made to further improve impact resistance, weather resistance, molding processability and external appearance of thermoplastic resins. Particularly, in order to be used in interior/exterior materials for electric and electronic products, it is necessary for the thermoplastic resins to realize various colors while exhibiting good weather resistance without painting. In addition, the thermoplastic resins are required to provide a pleasing external appearance after molding while realizing good physical properties.

Among such thermoplastic resins, an acrylonitrile-butadiene-styrene (ABS) resin can suffer from decomposition by ultraviolet (UV) light, which cause fission of π-bonds of butadiene rubber, thereby causing discoloration or cracking of products. In order to solve this problem, an acrylonitrile-styrene-acrylate (ASA) resin including an acrylic rubber instead of the butadiene rubber may be used. Since the ASA resin does not contain any π-bonds, it is possible to reduce decomposition by UV light. In addition, the ASA resin has a lower specific weight than glass or metal and exhibits good properties in terms of molding processability, chemical resistance, and thermal stability.

In order to enhance impact resistance of the ASA resin, a styrene-acrylonitrile copolymer (SAN) resin can be further added thereto, and/or the molecular weight of the SAN resin can be adjusted.

However, such methods can deteriorate coloring properties and external appearance of the resin despite improvement in impact resistance of the resin. Moreover, when the resin is exposed to the outside for a long time, the resin can suffer from surface carbonization (deterioration in weather resistance).

Therefore, there is a need for a thermoplastic resin composition which can realize various colors, excellent coloring properties and weather resistance while providing a high quality external appearance.

SUMMARY

Exemplary embodiments can provide a thermoplastic resin composition, which can realize good coloring properties and weather resistance while providing a high quality external appearance, and a molded article produced using the same.

The thermoplastic resin composition includes (A) an acrylic graft copolymer; (B) an aromatic vinyl-vinyl cyanide-based copolymer; (C) a light stabilizer; and (D) a UV absorber having a maximum absorption wavelength of about 250 nm to about 320 nm.

In exemplary embodiments, the thermoplastic resin composition may include about 0.1 parts by weight to about 10 parts by weight of the (C) light stabilizer and about 0.1 parts by weight to about 5 parts by weight of the (D) UV absorber, each based on about 100 parts by weight of a base resin comprising about 25 wt % to about 50 wt % of the (A) acrylic graft copolymer and about 50 wt % to about 75 wt % of the (B) aromatic vinyl-vinyl cyanide-based copolymer.

In exemplary embodiments, the thermoplastic resin composition may further include a polyalkyl (meth)acrylate.

In exemplary embodiments, the (B) aromatic vinyl-vinyl cyanide-based copolymer may be a polymer of a monomer mixture including an aromatic vinyl compound and a vinyl cyanide compound, and the aromatic vinyl compound may include an α-alkyl substituted aromatic vinyl compound.

In exemplary embodiments, the (A) acrylic graft copolymer may be a graft copolymer having a core-shell structure in which a monomer mixture including an aromatic vinyl compound and a vinyl cyanide compound is grafted to an acrylate-based rubber polymer core to form a shell.

In exemplary embodiments, the acrylate-based rubber polymer may have an average particle diameter of about 100 nm to about 500 nm.

In exemplary embodiments, the (C) light stabilizer may be a hindered amine light stabilizer.

In exemplary embodiments, the thermoplastic resin composition may further include at least one kind of additive selected from among antioxidants, lubricants, dyes, pigments, flame retardants, fillers, antimicrobials, release agents, plasticizers, and/or antistatic agents.

Exemplary embodiments relate to a molded article formed of the thermoplastic resin composition as set forth above.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A thermoplastic resin composition according to the present invention includes: (A) an acrylic graft copolymer; (B) an aromatic vinyl-vinyl cyanide-based copolymer; (C) a light stabilizer; and (D) a UV absorber.

(A) Acrylic Graft Copolymer

The acrylic graft copolymer can be prepared by graft polymerization of a monomer mixture including an aromatic vinyl compound and a vinyl cyanide compound to an acrylate-based rubber polymer. As used herein, polymerization may be realized by any known polymerization method, for example, emulsion polymerization, suspension polymerization, solution polymerization, bulk polymerization, and the like.

In exemplary embodiments, the acrylic graft copolymer may be a graft copolymer having a core-shell structure in which the monomer mixture including the aromatic vinyl compound and the vinyl cyanide compound is grafted to an acrylate-based rubber polymer core to form a shell.

In exemplary embodiments, the acrylate-based rubber polymer may be an alkyl acrylate rubber, for example, a $C_2$ to $C_{10}$ alkyl acrylate rubber. Examples of the acrylate-based rubber polymer may include, without limitation, a butyl acrylate rubber polymer, an ethyl hexyl acrylate rubber polymer, and the like, and mixtures thereof.

In exemplary embodiments, the (A) acrylic graft copolymer may include the acrylate-based rubber polymer in an amount of about 30 percent by weight (wt %) to about 90 wt %, for example, about 40 wt % to about 60 wt %, based on the total amount (total weight, 100 wt %) of the (A) acrylic graft copolymer in terms of solid content. When the acrylate-based rubber polymer is present in an amount within this range, the thermoplastic resin composition including the acrylic graft copolymer can exhibit good properties in terms of chemical resistance, thermal stability, and the like.

In exemplary embodiments, the acrylate-based rubber polymer may have an average particle diameter of about 100 nm to about 500 nm, for example, about 100 nm to about 300 nm. As used herein, the average particle diameter is obtained by measuring diameters of 100 particles in a photograph of the acrylate-based rubber polymer obtained using a transmission electron microscope (TEM), and averaging the measured particle diameters. Within this range, the thermoplastic resin composition including the acrylic graft copolymer can have good impact resistance and appearance characteristics, and good balance therebetween.

Examples of the aromatic vinyl compound may include without limitation styrene, α-methylstyrene, β-methylstyrene, p-t-butylstyrene, 2,4-dimethylstyrene, chlorostyrene, vinyltoluene, vinylnaphthalene, and the like. These may be used alone or in combination thereof. In exemplary embodiments, styrene is used as the aromatic vinyl compound.

The aromatic vinyl compound may be present in an amount of about 60 wt % to about 90 wt %, for example, about 65 wt % to about 85 wt %, based on the total amount (total weight, 100wt %) of the monomer mixture. When the aromatic vinyl compound is present in an amount within this range, the thermoplastic resin composition including the acrylic graft copolymer can exhibit good fluidity (molding processability) and the like.

Examples of the vinyl cyanide compound may include without limitation acrylonitrile, methacrylonitrile, and the like, and these compounds may be used alone or in combination thereof. In exemplary embodiments, acrylonitrile is used as the vinyl cyanide compound.

The vinyl cyanide compound may be present in an amount of about 10 wt % to about 40 wt %, for example, about 15 wt % to about 35 wt %, based on the total amount (total weight, 100wt %) of the monomer mixture. When the vinyl cyanide compound is present in an amount within this range, the thermoplastic resin composition including the acrylic graft copolymer can exhibit good properties in term of chemical resistance, mechanical properties, and the like.

In exemplary embodiments, the (A) acrylic graft copolymer may include the monomer mixture including the aromatic vinyl compound and the vinyl cyanide compound in an amount of about 10 wt % to about 70 wt %, for example, about 40 wt % to about 60 wt %, based on the total amount (total weight, 100 wt %) of the (A) acrylic graft copolymer. When the monomer mixture is present in an amount within this range, the thermoplastic resin composition including the acrylic graft copolymer can exhibit good properties in terms of chemical resistance, thermal stability, and the like.

In exemplary embodiments, the acrylic graft copolymer may be an acrylonitrile-styrene-acrylate graft copolymer (g-ASA). The acrylonitrile-styrene-acrylate graft copolymer may be prepared by adding acrylonitrile and styrene to acrylate rubber, followed by polymerization of acrylonitrile and styrene by a typical polymerization method (graft polymerization to the rubber).

In exemplary embodiments, the acrylic graft copolymer may include two or more acrylic graft copolymers in which rubber polymers have different average particle diameters. For example, the acrylic graft copolymer may be a mixture of an acrylic graft copolymer in which the rubber polymer has an average particle diameter of about 100 nm to about 200 nm and an acrylic graft copolymer in which the rubber polymer has an average particle diameter of greater than about 200 nm to about 500 nm. According to this embodiment, the thermoplastic resin composition can exhibit further improved impact resistance with minimal or no deterioration in other properties.

In exemplary embodiments, the acrylic graft copolymer may include two or more acrylic graft copolymers having different amounts of components (rubber polymer, aromatic vinyl compound and/or vinyl cyanide compound). According to this embodiment, the thermoplastic resin composition can exhibit further improved impact resistance, chemical resistance, and thermal resistance with minimal or no deterioration in other properties.

In some embodiments, the (A) acrylic graft copolymer may be present in an amount of about 10 wt % to about 70 wt %, for example, about 25 wt % to about 50 wt %, based on the total amount (total weight, 100 wt %) of the base resin including the (A) acrylic graft copolymer and the (B) aromatic vinyl-vinyl cyanide-based copolymer. In some embodiments, the base resin may include the (A) acrylic graft copolymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments, the amount of the (A) acrylic graft copolymer can be in a range from about any of the foregoing amounts to about any other of the foregoing amounts.

When the base resin includes the (A) acrylic graft copolymer in an amount within this range, the thermoplastic resin composition can exhibit good properties in terms of weather resistance, thermal resistance, and the like.

(B) Aromatic Vinyl-Vinyl Cyanide-Based Copolymer

The aromatic vinyl-vinyl cyanide-based copolymer may be a copolymer of a monomer mixture including an aromatic vinyl compound and a vinyl cyanide compound.

In exemplary embodiments, the aromatic vinyl-vinyl cyanide-based copolymer may have a weight average molecular weight of 15,000 g/mol to 400,000 g/mol, for example, 20,000 g/mol to 200,000 g/mol. As used herein, the weight average molecular weight of the aromatic vinyl-vinyl cyanide-based copolymer is measured by gel permeation chromatography (GPC; Agilent Technologies 1200 series, column: Shodex LF-804 (8.0.1.D.×300 mm), standard sample: polystyrene (Shodex Co., Ltd.)) after dissolving a powder sample in tetrahydrofuran (THF). When the aromatic vinyl-vinyl cyanide-based copolymer has a weight average molecular weight within this range, the thermoplastic resin composition can exhibit good properties in terms of thermal resistance, chemical resistance, and the like.

In exemplary embodiments, the aromatic vinyl compound may include an α-alkyl substituted aromatic vinyl compound. Examples of the aromatic vinyl compound may include without limitation styrene, α-methylstyrene, β-methylstyrene, o-ethylstyrene, m-ethylstyrene, p-ethylstyrene, p-t-butylstyrene, 2,4-dimethylstyrene, chlorostyrene, vinyltoluene, vinylnaphthalene, and the like. These may be used alone or in combination thereof. In exemplary embodiments, styrene, α-methylstyrene, and/or combinations thereof may be used.

The aromatic vinyl compound may be present in an amount of about 60 wt % to about 90 wt %, for example, about 65 wt % to about 85 wt %, based on the total amount (total weight, 100 wt %) of the monomer mixture. When the monomer mixture includes the aromatic vinyl compound in an amount within this range, the thermoplastic resin composition can exhibit good thermal resistance.

Examples of the vinyl cyanide compound may include without limitation acrylonitrile, methacrylonitrile, ethacrylonitrile, and the like. These may be used alone or in combination thereof. For example, acrylonitrile may be used.

The vinyl cyanide compound may be present in an amount of about 10 wt % to about 40 wt %, for example, about 15 wt % to about 35 wt %, based on the total amount (total weight 100 wt %) of the monomer mixture. When the monomer mixture includes the vinyl cyanide compound in an amount within this range, the thermoplastic resin composition can exhibit good chemical resistance.

Examples of the aromatic vinyl-vinyl cyanide-based copolymer may include without limitation a copolymer of styrene and acrylonitrile; a copolymer of α-methylstyrene and acrylonitrile; and/or a copolymer of styrene, α-methylstyrene and acrylonitrile. For example, the aromatic vinyl-vinyl cyanide-based copolymer may be a mixture of the styrene-acrylonitrile copolymer (SAN) and the copolymer of α-methylstyrene and acrylonitrile (AMS SAN) mixed in a weight ratio of about 1:about 0.1 to about 1:about 10, for example, about 1:about 0.2 to about 1:about 2. According to the embodiments, the thermoplastic resin composition can have improved compatibility.

In exemplary embodiments, the (B) aromatic vinyl-vinyl cyanide-based copolymer may be present in an amount of about 30 wt % to about 90 wt %, for example, about 50 wt % to about 75 wt %, based on the total amount (total weight, 100 wt %) of the base resin including the (A) acrylic graft copolymer and the (B) aromatic vinyl-vinyl cyanide-based copolymer. In some embodiments, the base resin may include the (B) aromatic vinyl-vinyl cyanide-based copolymer in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments, the amount of the (B) aromatic vinyl-vinyl cyanide-based copolymer can be in a range from about any of the foregoing amounts to about any other of the foregoing amounts.

When the base resin includes the (B) aromatic vinyl-vinyl cyanide-based copolymer in an amount within this range, the thermoplastic resin composition can exhibit improved properties in terms of impact resistance, weather resistance, coloring properties, and the like.

(C) Light Stabilizer

The light stabilizer serves to improve light stability and weather resistance of the thermoplastic resin composition, and may be selected from any light stabilizers typically used in the art. For example, the light stabilizer may be a hindered amine light stabilizer (HALS).

Examples of the hindered amine light stabilizer may include without limitation bis(2,2,6,6-tetramethyl-4-piperidyl)sebacate, bis(N-octyloxy-tetramethyl)piperidinyl sebacate, bis(1,2,2,6,6-pentamethyl-4-piperidyl)sebacate, methyl-1,2,2,6,6-pentamethyl-4-piperidyl sebacate, tetrakis (2,2,6,6-tetramethyl-4-piperidyl)-1,2,3,4-butanetetracarboxylate, tetrakis(1,2,2,6,6-pentamethyl-4-piperidyl)-1,2,3, 4-butanetetracarboxylate, 1,2,3-tris(1,2,2,6,6-pentamethyl-4-piperidyl)-4-tridecylbutane-1,2,3,4-tetracarboxylate, 1,2, 3-tris(2,2,6,6-tetramethyl-4-piperidyl)-4-tridecylbutane-1,2, 3,4-tetracarboxylate, 1,2,3,4-butanetetracarboxylic acid, and a condensate of 1,2,2,6,6-pentamethyl-4-piperidinol and β,β,β',β'-tetramethyl-3,9-(2,4,8,10-tetraoxaspiro[5.5]undecane)diethanol, and the like. These may be used alone or in combination thereof.

In exemplary embodiments, the light stabilizer may be present in an amount of about 0.1 parts by weight to about 10 parts by weight, for example, about 0.2 parts by weight to about 2 parts by weight, based on about 100 parts by weight of the base resin ((A)+(B)). In some embodiments, the light stabilizer may be present in an amount of about 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments, the amount of the light stabilizer can be in a range from about any of the foregoing amounts to about any other of the foregoing amounts.

When the composition includes the light stabilizer in an amount within this range, the thermoplastic resin composition can exhibit improved properties in terms of light stability, weather resistance, and the like.

(D) UV Absorber

The UV absorber according to the invention includes a UV absorber having a maximum absorption wavelength of about 250 nm to about 320 nm, for example, about 270 nm to about 290 nm, and can remarkably suppress surface carbonization of a molded article by sunlight (UV light and the like) while avoiding discoloration and deterioration in mechanical properties even after exposure for a long time.

The UV absorber having a maximum absorption wavelength of about 250 nm to about 320 nm can absorb UV light in a shorter wavelength band than UV absorbers having a maximum absorption wavelength of about 340 nm or higher, such as benzophenone-based UV absorbers, benzotriazole-based UV absorbers, and the like, thereby improving light stability with respect to UV light. If the UV absorber has a maximum absorption wavelength of less than about 250 nm, it can be difficult to obtain desired effects, which can be provided by the UV absorber, and if the UV absorber has a maximum absorption wavelength of greater than about 320 nm, there is a concern of deterioration in effects of the UV absorber, which suppresses surface carbonization of the molded article due to UV light, discoloration, deterioration in mechanical properties, and the like.

In exemplary embodiments, the UV absorber may be a triazine compound having a maximum absorption wavelength within the above range. Examples of the triazine compound may include without limitation 2-(4,6-diphenyl-1,3,5-triazin-2-yl)-5-hexyloxy-phenol, 6-bis(2,4-dimethylphenyl)-1,3,5-triazine, tris[2,4,6-[2-{4-(octyl-2-methylethanoate)oxy-2hydroxyphenyl}]-1,3,5-triazine, and the like. These may be used alone or in combination thereof. In exemplary embodiments, 2-(4,6-diphenyl-1,3,5-triazin-2-yl)-5-hexyloxy-phenol may be used.

In exemplary embodiments, the UV absorber may be present in an amount of about 0.1 parts by weight to about 5 parts by weight, for example, about 0.2 parts by weight to about 2 parts by weight, based on the about 100 parts by weight of the base resin ((A)+(B)). In some embodiments, the UV absorber may be present in an amount of about 0.1, 0.2, 0.3, 0.4, 0.5, 0.6, 0.7, 0.8, 0.9, 1, 2, 3, 4, or 5 parts by weight. Further, according to some embodiments, the amount of the UV absorber can be in a range from about any of the foregoing amounts to about any other of the foregoing amounts.

When the composition includes the UV absorber in an amount within this range, the thermoplastic resin composition can exhibit good properties in terms of coloring properties, weather resistance and the like, can secure a good external appearance of a molded article, and can suppress surface carbonization of the molded article.

In exemplary embodiments, the weight ratio of the (C) light stabilizer to the (D) UV absorber ((C):(D)) may range from about 1:about 0.1 to about 1:about 10, for example, about 1:about 0.5 to about 1:about 2. Within this range, the thermoplastic resin composition can exhibit further improved properties in terms of coloring properties, weather resistance and the like, can secure a good external appearance of a molded article, and can suppress surface carbonization of the molded article.

According to exemplary embodiments, the thermoplastic resin composition may further include a polyalkyl (meth) acrylate in order to realize further improvement in external appearance of a molded article.

The polyalkyl (meth)acrylate is invulnerable to hydrolysis and can improve chemical resistance and compatibility with other components in the thermoplastic resin composition. For example, the polyalkyl (meth)acrylate may be prepared by typical polymerization of raw monomers including an alkyl (meth)acrylate, such as suspension polymerization, bulk polymerization, emulsion polymerization, and the like.

In exemplary embodiments, the alkyl (meth)acrylate includes a $C_1$ to $C_{10}$ alkyl group, and may include, for example, methyl (meth)acrylate, ethyl (meth)acrylate, butyl (meth)acrylate, and the like, and combinations thereof. In addition, examples of the alkyl (meth)acrylate may include glycidyl (meth)acrylate and hydroxy ethyl (meth)acrylate, which are alkyl (meth)acrylates substituted with an epoxy group and a hydroxyl group, respectively, without being limited thereto. These may be used alone or in combination thereof.

In exemplary embodiments, the polyalkyl (meth)acrylate may have a weight average molecular weight of about 10,000 g/mol to about 200,000 g/mol, for example, about 15,000 g/mol to about 150,000 g/mol, as measured by gel permeation chromatography (GPC). When the polyalkyl (meth)acrylate has a weight average molecular weight within this range, the thermoplastic resin composition can exhibit improved properties in terms of compatibility, weather resistance, coloring properties, and the like.

In exemplary embodiments, the thermoplastic resin composition may include the polyalkyl (meth)acrylate in an amount of about 0.1 wt % to about 30 wt %, for example, about 1 wt % to about 20 wt %, and as another example about 3 wt % to about 10 wt %, based on the total amount (total weight, 100 wt %) of the base resin. When the composition include the polyalkyl (meth)acrylate in an amount within this range, the thermoplastic resin composition can exhibit improved properties in terms of impact resistance and weather resistance, and can realize a high quality external appearance.

The raw monomers constituting the polyalkyl (meth) acrylate may further include a vinyl monomer. Examples of the vinyl monomer may include without limitation aromatic vinyl monomers such as styrene, α-methylstyrene, and p-methylstyrene, and the like; and unsaturated nitrile monomers such as acrylonitrile, methacrylonitrile, and the like. These may be used alone or in combination thereof.

According to exemplary embodiments, the thermoplastic resin composition may further include one or more additives within a range not deteriorating advantageous effects of the present invention, as needed.

In exemplary embodiments, examples of the additives may include without limitation antioxidants, lubricants, dyes, pigments, flame retardants, fillers, antimicrobials, release agents, plasticizers, antistatic agents, and the like, and combinations thereof. The additives may be used in an amount of about 50 parts by weight or less, for example, about 0.1 parts by weight to about 20 parts by weight, based on about 100 parts by weight of the base resin.

A molded article produced from the thermoplastic resin composition is also provided. The thermoplastic resin composition may be prepared in pellet form by mixing the aforementioned components with additives as needed, followed by melt extrusion in an extruder. For example, the molded article may be produced from the thermoplastic resin composition in pellet form by a typical method, such as extrusion molding, injection molding, calender molding, vacuum molding, and the like. The molded article can exhibit good properties in terms of weather resistance, coloring properties, appearance characteristics, and the like, and thus can be advantageously used in interior/exterior materials for electric or electronic products.

Hereinafter, the present invention will be described in more detail with reference to the following examples. It should be understood that these examples are provided for illustration only and are not to be construed in any way as limiting the present invention.

EXAMPLES

Details of components used in the following Example and Comparative Examples are as follows.

(A) Acrylic Graft Copolymer (A1) g-ASA prepared by graft polymerization of 60 wt % of styrene and acrylonitrile (styrene:acrylonitrile=67:33 (weight ratio)) to 40 wt % of butyl acrylate rubber having an average particle diameter of 180 nm is used.

(A2) g-ASA prepared by graft polymerization of 40 wt % of styrene and acrylonitrile (styrene:acrylonitrile=67:33 (weight ratio)) to 60 wt % of butyl acrylate rubber having an average particle diameter of 320 nm is used.

(B) Aromatic Vinyl-Vinyl Cyanide-Based Copolymer (B1) A styrene-acrylonitrile copolymer (SAN, styrene: acrylonitrile=68:32 (weight ratio)) having a weight average molecular weight of 120,000 g/mol is used.

(B2) An α-methylstyrene-styrene-acrylonitrile copolymer (AMS SAN, α-methylstyrene:styrene:acrylonitrile=54:19: 27 (weight ratio), glass transition temperature: 118° C.) having a weight average molecular weight of 160,000 g/mol is used.

(C) Light Stabilizer

A hindered amine light stabilizer TINUVIN 770DF is used.

(D) UV Absorber (D1) A triazine compound YK-1577 (2-(4,6-diphenyl-1, 3,5-triazine-2-yl)-5-hexyloxy-phenol, maximum absorption wavelength: 274 nm) available from Global Planning Co., Ltd. is used.

(D2) A benzotriazole compound TINUVIN P (maximum absorption wavelength 341 nm) is used.

(D3) A benzotriazole compound TINUVIN 327 (maximum absorption wavelength 353 nm) is used.

(E) Polyalkyl (meth)acrylate

A polymethyl methacrylate (Altuglas V040, Arkema Co., Ltd.) is used.

In the following Table 1, each of (A1), (A2), (B1), (B2) and (E) is represented by wt %, and each of (C), (D1), (D2) and (D3) is represented by parts by weight based on 100 parts by weight ((A1)+(A2)+(B1)+(B2)+(E)=100wt %).

Examples 1 and 2

Thermoplastic resin compositions are prepared in pellet form by mixing the aforementioned components in amounts as listed in the following Table 1 in a mixer, followed by extrusion in a twin-screw extruder (L/D=29, ⌀=45 mm) Specimens for evaluation of physical properties are prepared by injection molding of each of the resin compositions at an injection molding temperature of 250° C. using a 60 oz. injection machine. These specimens are dried at 80° C. for 2 hours and cut to a size of 9 cm×5 cm ×0.2 cm. Physical properties of the thermoplastic resin compositions are evaluated using the specimens, and results are shown in Table 2.

Comparative Example 1

Specimens are prepared in the same manner as in Example 1 except that (D2) benzotriazole UV absorber 1 (maximum absorption wavelength: 341 nm) is used instead of the (D1) UV absorber (maximum absorption wavelength: 274 nm) in the thermoplastic resin composition of Example 1.

Comparative Example 2

Specimens are prepared in the same manner as in Example 1 except that (D3) benzotriazole UV absorber 2 (maximum absorption wavelength: 353 nm) is used instead of the (D1) UV absorber (maximum absorption wavelength: 274 nm) in the thermoplastic resin composition of Example 1.

Comparative Example 3

Specimens are prepared in the same manner as in Example 2 except that (D2) benzotriazole UV absorber 1 (maximum absorption wavelength: 341 nm) is used instead of the (D1) UV absorber (maximum absorption wavelength: 274 nm) in the thermoplastic resin composition of Example 2.

Evaluation of Properties (1) Weather Resistance and Coloring Properties

After the specimens are left under the following conditions, weather resistance (discoloration resistance, dE) and coloring properties (dL, da and db) are measured using a weather resistance tester (Metaling Vertical Weather Meter MV-3000, Suga Co., Ltd.). dE, dL, da and db are calculated according to Equation 1, based on L, a and b values obtained using a Minolta CM-2500C colorimeter before and after weather resistance testing.

Light source: metal halide lamp
Irradiance: 55 W/m² (530 W/m² at 340 nm)
Temperature: 38° C.
Black panel temperature: 63° C.
Relative humidity: 50%
Test duration (1 cycle, 2 phases): 2 hrs/1 cycle
L: Lightness
a: red (+)<->green (−)
b: yellow (+)<->blue (−)

$$dE=\sqrt{(dL)^2+(da)^2+(db)^2}$$ [Equation 1]

In Equation 1, dE is a color variation, dL is a difference of L values before and after weather resistance testing, da is a difference of a values before and after weather resistance testing, and db is a difference of b values before and after weather resistance testing.

(2) Gloss Maintenance Ratio

A gloss maintenance ratio shows an appearance state after evaluation of weather resistance and is obtained by measuring a ratio of gloss of a specimen after evaluation of weather resistance to initial gloss thereof. Here, the gloss maintenance ratio is calculated according to Equation 2 after measuring gloss at an angle of 60 degrees of a light source using a gloss meter VG-7000 (Nippon Denshoku Co., Ltd.).

Gloss maintenance ratio (%)=[(initial gloss−gloss after evaluation of weather resistance)/initial gloss]×100 [Equation 2]

TABLE 1

| | Example | | Comparative Example | | |
|---|---|---|---|---|---|
| Component | 1 | 2 | 1 | 2 | 3 |
| (A1) | 24 | 20 | 24 | 24 | 20 |
| (A2) | 15 | 19 | 15 | 15 | 19 |
| (B1) | 40 | 35 | 40 | 40 | 35 |
| (B2) | 21 | 21 | 21 | 21 | 21 |
| (C) | 0.65 | 0.65 | 0.65 | 0.65 | 0.65 |
| (D1) | 0.65 | 0.65 | — | — | — |
| (D2) | — | — | 0.65 | — | 0.65 |
| (D3) | — | — | — | 0.65 | — |
| (E) | — | 5 | — | — | 5 |

TABLE 2

| | Example | | Comparative Example | | |
|---|---|---|---|---|---|
| Item | 1 | 2 | 1 | 2 | 3 |
| dL | −0.57 | −1.45 | −1.98 | −2.12 | −1.73 |
| da | 0.42 | 0.27 | 0.46 | 0.45 | 0.33 |
| db | 3.03 | 2.23 | 2.83 | 2.79 | 2.65 |
| dE | 3.12 | 2.67 | 3.48 | 3.53 | 3.18 |
| Gloss maintenance ratio (%) | 32 | 48 | 19 | 13 | 32 |

From Table 2, the thermoplastic resin compositions of Examples 1 and 2 exemplifying the present invention, which are prepared using the UV absorber having a maximum absorption wavelength of 274 nm, provide significant improvement in terms of weather resistance (dE), coloring properties (dL, da, db), appearance characteristics (gloss maintenance ratio) and light stability, as compared with the thermoplastic resin compositions of Comparative Examples prepared using the UV absorbers having maximum absorption wavelengths of 341 nm or 353 nm.

In contrast, the thermoplastic resin compositions of Comparative Examples 1 to 3 prepared using the UV absorber having higher maximum absorption wavelengths than the compositions of Examples 1 and 2 suffer from severe surface carbonization, significant decrease in dL value (deterioration in coloring properties), and increase in dE value causing severe variation in color difference (deterioration in weather resistance). Moreover, the thermoplastic resin compositions of Comparative Examples 1 to 3 suffer from significant reduction in gloss maintenance ratio, which means a significant deterioration in appearance characteristics, as compared with the thermoplastic resin compositions of Examples 1 and 2.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

What is claimed is:

1. A thermoplastic resin composition comprising:
   (A) an acrylic graft copolymer, wherein the (A) acrylic graft copolymer is a graft copolymer having a core-shell structure in which a monomer mixture comprising an aromatic vinyl compound and a vinyl cyanide compound is grafted to an acrylate-based rubber polymer core to form a shell;
   (B) an aromatic vinyl-vinyl cyanide-based copolymer;
   (C) a light stabilizer; and
   (D) a UV absorber having maximum absorption at a wavelength of 274 nm.

2. The thermoplastic resin composition according to claim 1, comprising: about 0.1 parts by weight to about 10 parts by weight of the (C) light stabilizer; and about 0.1 parts by weight to about 5 parts by weight of the (D) UV absorber, each based on about 100 parts by weight of a base resin comprising about 25 wt % to about 50 wt % of the (A) acrylic graft copolymer and about 50 wt % to about 75 wt % of the (B) aromatic vinyl-vinyl cyanide-based copolymer.

3. The thermoplastic resin composition according to claim 1, further comprising a polyalkyl (meth)acrylate.

4. The thermoplastic resin composition according to claim 1, wherein the (B) aromatic vinyl-vinyl cyanide-based copolymer is a polymer of a monomer mixture comprising an aromatic vinyl compound and a vinyl cyanide compound, wherein the aromatic vinyl compound comprises an α-alkyl substituted aromatic vinyl compound.

5. The thermoplastic resin composition according to claim 1, wherein the acrylate-based rubber polymer has an average particle diameter of about 100 nm to about 500 nm.

6. The thermoplastic resin composition according to claim 1, wherein the (C) light stabilizer is a hindered amine light stabilizer.

7. The thermoplastic resin composition according to claim 1, further comprising at least one additive selected from the group consisting of antioxidants, lubricants, dyes, pigments, flame retardants, fillers, antimicrobials, release agents, plasticizers, antistatic agents, and mixtures thereof.

8. A molded article formed of the thermoplastic resin composition according to claim 1.

9. The thermoplastic resin composition according to claim 1, wherein the acrylic graft copolymer (A) comprises an aromatic vinyl compound and a vinyl cyanide compound grafted to rubber polymer consisting of an acrylate-based rubber polymer.

10. The thermoplastic resin composition according to claim 1, wherein the acrylic graft copolymer (A) is an acrylonitrile-styrene-acrylate graft copolymer (g-ASA).

11. The thermoplastic resin composition according to claim 9, wherein the acrylic graft copolymer (A) includes two or more acrylic graft copolymers including rubber polymers with different average particle diameters.

12. The thermoplastic resin composition according to claim 11, wherein the acrylic graft copolymer (A) includes an acrylic graft copolymer in which the rubber polymer has an average particle diameter of about 100 nm to about 200 nm and an acrylic graft copolymer in which the rubber polymer has an average particle diameter of greater than about 200 nm to about 500 nm.

* * * * *